US009352583B2

(12) United States Patent
La Fleur et al.

(10) Patent No.: US 9,352,583 B2
(45) Date of Patent: May 31, 2016

(54) THERMAL RECORDING MATERIAL WITH IMPROVED INITIAL CONTRAST

(71) Applicant: Rohm and Haas Company, Philadelphia, PA (US)

(72) Inventors: Edward La Fleur, Holland, PA (US); Gaurav Pranami, Philadelphia, PA (US); Himal Ray, Collegeville, PA (US)

(73) Assignee: Rohm and Haas Company, Philadelphia, PA (US)

(*) Notice: Subject to any disclaimer, the term of this patent is extended or adjusted under 35 U.S.C. 154(b) by 38 days.

(21) Appl. No.: 14/458,631

(22) Filed: Aug. 13, 2014

(65) Prior Publication Data

US 2015/0049152 A1  Feb. 19, 2015

Related U.S. Application Data

(60) Provisional application No. 61/865,372, filed on Aug. 13, 2013.

(51) Int. Cl.
| | |
|---|---|
| *B41M 5/124* | (2006.01) |
| *B41M 5/36* | (2006.01) |
| *B41J 2/32* | (2006.01) |
| *B32B 27/20* | (2006.01) |

(52) U.S. Cl.
CPC . *B41J 2/32* (2013.01); *B32B 27/20* (2013.01); *B41M 5/1243* (2013.01); *B41M 5/366* (2013.01); *Y10T 428/254* (2015.01)

(58) Field of Classification Search
CPC ...... B41M 5/124; B41M 5/1243; B41M 5/36; B41M 5/366; B32B 27/20; Y10T 428/254; B31B 27/20
USPC ............................. 428/327; 347/221; 252/582
See application file for complete search history.

(56) References Cited

U.S. PATENT DOCUMENTS

| | | | |
|---|---|---|---|
| 3,967,034 A | 6/1976 | Meadus et al. | |
| 4,103,044 A | 7/1978 | Eisenberg et al. | |
| 6,028,029 A | 2/2000 | Takeuchi | |
| 7,768,602 B2 | 8/2010 | LaFleur et al. | |
| 7,893,162 B2 | 2/2011 | Lafleur et al. | |
| 8,563,130 B2 * | 10/2013 | Chung ................... | C09D 5/006 252/582 |
| 2011/0172094 A1 | 7/2011 | Deng et al. | |
| 2011/0251060 A1 | 10/2011 | Harrison et al. | |

FOREIGN PATENT DOCUMENTS

| | | |
|---|---|---|
| EP | 1211300 | 6/2002 |
| GB | 997289 | 7/1965 |
| JP | 1990080288 | 3/1990 |
| JP | 3193491 | 8/1991 |
| JP | 6247056 | 9/1994 |
| JP | 03176961 B2 | 6/2001 |
| WO | 2012145456 A1 | 10/2012 |

* cited by examiner

*Primary Examiner* — Bruce H Hess
(74) *Attorney, Agent, or Firm* — Karl E. Stauss

(57) ABSTRACT

The present invention provides a thermal recording material having a thermosensitive layer comprising single phase diffuser polymer particles. Each of the diffuser polymer particles has a refractive index at the center thereof ($RI_{center}$) different from a refractive index at the surface thereof ($RI_{surface}$), and a continuous refractive index gradient, sometimes referred to as GRIN technology. The diffuser polymer particles may have a $RI_{center}$ of from 1.46 to 1.61 and a particle size of 0.85 to 15 microns. Additionally, the thermal recording material of the present invention may also include heat deformable particles and a binder.

The present invention also provides a method for providing an image by subjecting selected portions of a recording material such as that described above to a physical agent selected from the group consisting of heat, pressure, and combinations thereof, sufficient to reduce the opacity of said selected portions.

8 Claims, No Drawings

THERMAL RECORDING MATERIAL WITH IMPROVED INITIAL CONTRAST

FIELD OF THE INVENTION

The present invention relates to thermal recording materials having a thermosensitive layer comprising diffuser polymer particles, as well as heat deformable particles and a binder. The diffuser polymer particles are single phase particles having a continuous refractive index gradient. Thermal recording materials having a thermosensitive layer comprising these diffuser polymer particles exhibit improved initial contrast because such particles reduce the loss of light and minimize spherical and chromatic aberration.

BACKGROUND OF THE INVENTION

Recording materials such as, for example, recording sheets, are used to provide an image and are well-known today. Thermal recording materials are those which produce an image upon application of heat, pressure or both, and typically include a solid substrate and a thermosensitive layer disposed on the solid substrate. The solid substrate is often flexible, such as paper, fabric, plastic, cardboard, etc., and may itself be colored or it may comprise a support and a colored layer disposed on the support, where the support is paper, fabric, plastic, cardboard, etc. The thermosensitive layer is initially opaque and conceals the color of the underlying solid substrate, but upon application of heat, pressure, or a combination of both, to specific portions of the thermosensitive layer, those portions become transparent and reveal the color of the underlying layer to produce an image on the recording material.

The thermosensitive layer should initially be opaque when dry, and must be transparent upon application of heat to reveal the color beneath. It is preferred that both initial opacity and post-heating transparency of the thermosensitive layer be maximized. To provide a clear image, the contrast between the opaque color of unheated portions of the thermosensitive layer and the underlying color should also be maximized.

The thermosensitive layer typically contains heat deformable particles, for example thermoplastic or wax, and a binder for fixing the heat deformable particles in the thermosensitive layer upon application to the solid substrate. It may also contain additional components including, but not limited to, for example, pigments or colorants, stabilizers, lubricants, thickeners, biocides, dispersants, and emulsifiers, among others.

Japanese Unexamined Patent Application No. JP1990-080288 discloses recording sheets having a thermosensitive layer comprising polymer particles embodying internal voids as the heat deformable particles, and binders. The polymer particles having voids are sometimes referred to as hollow spherical particles (HSPs) and, in JP1990-080288, are made from a thermoplastic resin such as polystyrene, poly(alkyl) methacrylates, poly(meth)acrylonitrile, polyvinyl compounds including polyvinyl chloride, polyvinyl alcohol and polyvinyl carbazole, cellulose acetate, cellulose triacetate, and polycarbonates, among others, and copolymers thereof.

International Patent Application Publication No. WO2012/145456 also discloses recording sheets having a thermosensitive layer comprising HSPs and binders, but also contains an opacity reducer. The HSPs have core-shell architecture and the shells are formed from polymerizing one or more ethylenically unsaturated monomers, preferably methyl methacrylate, ethyl acrylate, butyl acrylate, styrene, and combinations thereof. The opacity reducer is made from organic compounds such as, for example, aromatic oxalic acid esters, aromatic ethylene glycol ethers, p-toluenesulfonamide, o-toluenesulfonamide, and waxes such as erucamide and stearic acid amide, among others.

British Patent No. 997,289 discloses heat sensitive recording material having a porous thermosensitive layer comprising synthetic thermoplastic resin particles and an adhesive (i.e., binder). The synthetic thermoplastic resin particles are the heat deformable particles and are made from polyvinyl chloride, acrylic resins, polystyrene and other similar compounds.

A thermal magnetic recording medium suitable for making debit and credit cards, transportation passes, identification cards, and the like, is described in Japanese Patent Application Publication No. JP1991-193491(A) and includes a magnetic recording layer disposed on a substrate and a thermal recording layer disposed on the magnetic recording layer. The thermal recording layer is opaque at room temperature but is rendered transparent upon application of heat and is made from a styrene/acrylic copolymer resin, which is crosslinked. It is unclear whether a binder is required.

Japanese Patent No. JP03176961B2 describes a thermal recording material also suitable for cards and passes and which includes a thermosensitive layer comprising polymer particles having a multilayered structure as the heat deformable particles. These multilayered polymer particles comprise styrene-acrylic resin and opacity is accomplished by crosslinking one of the layers which then has a different refractive index than the other layers. Upon application of heat other layers coalesce to render the thermosensitive layer transparent.

Diffuser polymer particles having a continuous refractive index gradient such that a refractive index at the center thereof ($RI_{center}$) is different from a refractive index at the surface thereof ($RI_{surface}$) are known and sometimes referred to as gradient refractive index (GRIN) polymer particles.

For example, U.S. Pat. No. 7,893,162 B2 discloses light scattering compositions comprising single phase diffuser polymer particles having greater than 4 weight % crosslinking density and which exhibit a different refractive index at a center thereof ($RI_{center}$) than at a surface thereof ($RI_{surface}$), and where ($RI_{center}$)<($RI_{surface}$). The light scattering compositions of U.S. Pat. No. 7,893,162 B2 are useful for applications such as rear projection screens, illuminated signs, light fixtures, automotive sunroofs, greenhouse glazing and other uses.

U.S. Pat. No. 7,768,602 B2 describes light diffusing articles which may, for example, be in the form of optical films useful as diffuser films for LCD televisions, flat screen computer monitors, cell phone displays, and camera screens, for example. These light diffusing articles comprise a polymeric sheet-like substrate which is optically clear, and one or more layers of a coating composition comprising solid clear polymeric lenses, which may be divergent or convergent GRIN particles, and which may be single phase or multilayer, but all of which have a refractive index which varies continuously within the particles from the center to the surface.

Improvements in the performance of thermal recording materials are still sought. For example, thermal recording materials having increased initial opacity and brightness, as well as post-heating contrast, are sought. The present invention accomplishes such improvements by including single phase GRIN particles in the thermosensitive layer along with usual heat deformable particles and binders.

SUMMARY OF THE INVENTION

The present invention provides a thermal recording material having a thermosensitive layer comprising single phase diffuser polymer particles.

Each of the diffuser polymer particles has a center, a surface, a refractive index at the center thereof ($RI_{center}$) different from a refractive index at the surface thereof ($RI_{surface}$), and a continuous refractive index gradient. Suitable diffuser polymer particles may have a $RI_{center}$ of from 1.46 to 1.61, and may have a particle size of 0.85 to 15 microns.

In some embodiments, the diffuser polymer particles comprise at least one monomer selected from the group consisting of $C_1$-$C_8$ alkyl(meth)acrylates and styrene.

In some embodiments, the thermosensitive layer comprises from 10 to 70 wt. % of diffuser polymer particles, based on the total dry weight of the thermosensitive layer.

In some embodiments, the thermal recording material of the present invention further comprises heat deformable particles and a binder.

The present invention also provides a method for providing an image comprising: subjecting selected portions of a recording material according to any of the above embodiments to a physical agent selected from the group consisting of heat, pressure, and combinations thereof, sufficient to reduce the opacity of said selected portions.

DETAILED DESCRIPTION OF THE INVENTION

The thermal recording material of the present invention is suitable for making visual images on the surface of the recording material by application of heat, pressure or both, where the recording material may be in the form of a sheet or other structure having a surface upon which an image may be displayed. The thermal recording material of the present invention has improved initial opacity and brightness, as well as improved post-heating contrast which enhances image visibility and clarity, because the thermosensitive layer of such thermal recording material contains diffuser polymer particles, as discussed in more detail hereinbelow.

The term "copolymer" as used herein and in the appended claims refers to polymers polymerized from at least two different monomers.

The term "average particle size" as used herein and in the appended claims is the $d^{50}$ value measured on a Malvern Instruments particle size analyzer Mastersizer 2000.

The term "$RI_{center}$" as used herein and in the appended claims refers to the refractive index measured at the center of the diffuser polymer particles in glycerol using a Zeiss Jenaval Interphako Interference Microscope.

The term "$RI_{surface}$" as used herein and in the appended claims refers to the refractive index measured at the surface of the diffuser polymer particles in glycerol using a Zeiss Jenaval Interphako Interference Microscope.

The term "single phase" as used herein and in the appended claims in reference to the diffuser polymer particles means that the subject particles exhibit a gradual increase or decrease in refractive index (RI) from the center to the surface. The term single phase refers to the "as made" diffuser polymer particles. One of ordinary skill in the art will recognize that the diffuser polymer particles can in certain situations be modified upon combination with the heat deformable particles or binder.

The term "monovinyl arenes" used herein and in the appended claims encompasses monoethylenically unsaturated aromatic monomers including styrene, alkylstyrenes (e.g., methylstyrene and ethylstyrene), other substituted vinylbenzenes wherein the substituents do not interfere with polymerization, and vinyl polycyclic aromatic monomers.

The term (meth)acrylic acid used herein includes both acrylic acid and methacrylic acid. The use of the term "(meth)" followed by another term such as (meth)acrylate or (meth)acrylamide, as used throughout the disclosure, refers to both acrylates or acrylamides and methacrylates and methacrylamides, respectively.

The present invention relates to thermal recording materials having a solid substrate having a color, and a thermosensitive layer disposed on the substrate. The thermosensitive layer is initially opaque and conceals the color of the underlying solid substrate, but upon application of a physical agent selected from heat, pressure, and a combination of both, to specific portions of the thermosensitive layer, those portions become transparent and reveal the color of the underlying layer, thereby producing a visible image on the recording material.

The solid substrate is often flexible, such as paper, fabric, plastic, cardboard, etc., and may itself be colored or it may comprise a support and a colored layer disposed on the support, where the support made be made of a material such as paper, fabric, plastic, cardboard, and the like. The thermosensitive layer according to the present invention comprises diffuser polymer particles, heat deformable particles, and a binder.

Heat deformable particles suitable for use in the present invention are any of those now known, or discovered in the future, that are typically included in thermosensitive layer of thermal recording materials to render the thermosensitive layer initially opaque to conceal the color of the underlying substrate, yet allow selected portions of the thermosensitive layer become transparent after application of heat, pressure, or both, to reveal the underlying color. Thus, as discussed hereinabove, heat deformable particles should be made from a material or have a structure which will deform upon application of heat, pressure, or both, to become transparent. Such materials and structures are well-known to persons of ordinary skill in the relevant art and are made of materials including, for example without limitation, natural waxes, synthetic waxes, and thermoplastic resin. Furthermore, suitable heat deformable particles may have various structures including, without limitation, solid particle, spherical, core-shell, hollow spherical structure, among others as are familiar to persons of ordinary skill in the relevant art.

Suitable materials for the heat deformable particles may for example, without limitation, be selected from: natural waxes, such as carnuba wax, bees wax and lanolin wax; synthetic waxes, such as POLYWAX and other polyethylene-based materials, petroleum derived waxes; and thermoplastic resins, such as polystyrene, polypropylene, polyvinyl chloride, polyamides, polyacrylates, and polycarbonates.

In some embodiments of the present invention, the heat deformable particles have an average particle size of 0.3 to 50 microns. In some aspects of these embodiments, the heat deformable particles have an average particle size of 0.4 to 25 microns. In some aspects of these embodiments, the heat deformable particles have an average particle size of 0.5 to 10 microns. In some aspects of these embodiments, the heat deformable particles have an average particle size of 0.5 to 5 microns.

In some embodiments of the present invention, the refractive index of the heat deformable particles is 1.4 to 1.6. The refractive index of the deformable particles and the desired degree of contrast will determine the desired refractive index of the diffuser particles, as discussed hereinbelow.

In some embodiments of the present invention, the thermosensitive layer of the thermal recording material the heat deformable particles comprise 5 to 90 wt %, of the thermosensitive layer, based on the total dry weight of the thermosensitive layer (i.e., total dry weight of heat deformable particles, binder and diffuser polymer particles). In some aspects of these embodiments, the heat deformable particles comprise 10 to 80 wt % of the thermosensitive layer. In some aspects of these embodiments, the heat deformable particles comprise 20 to 50 wt % of the thermosensitive layer.

The thermosensitive layer also comprises binders. Suitable binders for the thermosensitive layer of the recording material of the present invention include, for example, particulate polymers such as, without limitation, emulsion polymers and soluble polymers which are commonly known as resins. The polymeric binder may be present in an amount of from 0% to 40%, preferably from 10% to 30%, by weight based on the total dry weight of the thermosensitive layer. When the calculated Tg of the heat deformable particles is less than 50° C., it may not be necessary to use a binder, although it is optional to use a coalescent or plasticizer to facilitate film integrity.

The calculated glass transition temperature ("Tg") of the polymeric binder is typically from −65° C. to 105° C., or in the alternative, from −25° C. to 35° C. The weight average particle diameter of polymeric binder particles formed by emulsion polymerization is typically from 30 nm to 500 nm, preferably from 40 nm to 400 nm, and more preferably from 50 nm to 250 nm.

The polymeric binder may be or may include resin(s) other than emulsion polymers, including, for example, thermoplastic and crosslinkable resins. Useful resin components include, for example, polyvinyl alcohol, protein such as, for example, casein, starch, gelatin, copolymers of acrylic acid esters or methacrylic acid esters, copolymers of styrene and acrylic or methacrylic acid esters, copolymers of styrene and acrylic acid, styrene-butadiene copolymers, copolymers of vinyl acetate with other acrylic or methacrylic acid esters, and the like.

The polymeric binder may be produced using post-cure reactions. In some aspects of these embodiments, the post-cure reaction occurs when a copolymer is formed from a monomer having a pendant peroxide group, which is then activated by heating to a temperature higher than that used in the polymerization. The activated peroxide group will promote crosslinking of the binder.

In some embodiments of the present invention, the refractive index of the binder is 1.4 to 1.6. In some aspects of these embodiments, the refractive index of the binder is 1.46 to 1.48, or even 1.51 to 1.54.

In some embodiments of the present invention, the thermosensitive layer of the thermal recording material the binder comprises 5 to 50 wt %, of the thermosensitive layer, based on the total dry weight of the thermosensitive layer (i.e., total dry weight of heat deformable particles, binder and diffuser polymer particles). In some aspects of these embodiments, the binder comprises 10 to 35 wt %, or even 15 to 30 wt % of the thermosensitive layer.

In accordance with the present invention, the diffuser polymer particles are single phase, each having a center, a surface, and a continuous refractive index gradient such that the refractive index at the center thereof ($RI_{center}$) and a refractive index at the surface thereof, ($RI_{surface}$). Additionally, the diffuser particles exhibit a gradual change in refractive index from the center to the surface. In other words, the refractive index of the diffuser polymer particles changes gradually from the center to the surface, rather than in one or more steps such as occurs in some particles having multiple structural layers, particularly core/shell structures.

Use of the diffuser polymer particles in the thermosensitive layer of thermal recording material reduces the loss of light, by the self focusing property of the particles and minimizes spherical and chromatic aberration which, in turn, enhances initial opacity and brightness of the thermosensitive layer.

Because the refractive index of the diffuser polymer particle varies continuously within the particle, a unique focus is defined by light rays that transmit through the particle. A consequence of this is the observation that light rays are bent with the change in refractive index. This bending of the light rays results in elimination of light loss through total internal reflection, and creation of a well defined focal point and focal length, unique to the particle geometry.

In some embodiments of the present invention, the diffuser polymer particles are produced using step reaction or chain growth polymerization. In some aspects of these embodiments, the diffuser polymer particles are produced using one or more vinyl monomers. In some aspects of these embodiments, the diffuser polymer particles comprise rubbery polymers. In some aspects of these embodiments, the diffuser polymer particles comprise glassy polymers. In some aspects of these embodiments, the diffuser polymer particles comprise at least one monomer selected from the group consisting of $C_1$-$C_8$ alkyl (meth)acrylates and styrene. In some aspects of these embodiments, the diffuser polymer particles are produced through free-radical initiated polymerization. In some aspects of these embodiments, the diffuser polymer particles are prepared through polymerization or copolymerization of monomers selected, for example, from diolefins (e.g., butadiene, isoprene); vinyl aromatic monomers (e.g., styrene, chlorostyrene); vinyl esters (e.g., vinyl acetate, vinyl benzoate); acrylonitrile; methylacrylonitrile; (meth)acrylate esters (e.g., methyl methacrylate, butyl methacrylate, phenyl methacrylate, ethyl acrylate, butyl acrylate, 2-ethylhexyl acrylate, benzyl acrylate); and vinyl chloride. In some aspects of these embodiments, the alkyl acrylate derivatives include halogenated species for example chlorinated species and fluorinated species.

In some embodiments of the present invention, the diffuser polymer particles are selected from rubbery alkyl acrylate polymers. In some aspects of these embodiments, the diffuser polymer particles are produced using $C_{2-8}$ alkyl acrylate monomers copolymerized with >4 wt % to 99 wt % crosslinking monomer(s). In some aspects of these embodiments, the diffuser polymer particles are produced using $C_{2-8}$ alkyl acrylate monomers copolymerized with >4 wt % to 50 wt % crosslinking monomer(s). In some aspects of these embodiments, the diffuser polymer particles are produced using $C_{2-8}$ alkyl acrylate monomers copolymerized with 5 wt % to 10 wt % crosslinking monomer(s). In some aspects of these embodiments, the diffuser polymer particles are produced using 0 to 50 wt % of other copolymerizable vinyl monomer(s). In some aspects of these embodiments, the $C_{2-8}$ alkyl acrylate monomers is butyl acrylate. In some aspects of these embodiments, the other copolymerizable vinyl monomer(s) is selected from alkyl methacrylates and monovinyl arenes. In some aspects of these embodiments, the other copolymerizable vinyl monomer(s) is styrene.

The diffuser polymer particles are crosslinked so they retains their shape on application of heat to a temperature at which heat deformable particles melt and deform, when the film becomes transparent. Crosslinking monomers suitable for use in producing the crosslinked diffuser polymer particles of the present invention include crosslinking monomers well known to those skilled in the art that are compatible with the other materials from which the diffuser polymer particles are produced.

In some embodiments of the present invention, for example, the crosslinking monomers are selected from multi-ethylenically unsaturated monomers in which the ethylenically unsaturated groups have approximately equal reactivity; multi-ethylenically unsaturated monomers having two or more non-conjugated double bonds of differing reactivity; and combinations thereof. In some aspects of these embodiments, the multi-ethylenically unsaturated monomers in which the ethylenically unsaturated groups have approximately equal reactivity are selected from divinylbenzene; glycol di- and trimethacrylates and acrylates; and triol triacrylates and methacrylates. In some aspects of these embodiments, the crosslinking monomers are selected from butylene glycol diacrylates. In some aspects of these embodiments, the multi-ethylenically unsaturated monomers having two or more non-conjugated double bonds of differing reactivity are selected from allyl methacrylate; diallyl maleate and allyl acryloxypropionate. In some aspects of these embodiments, the crosslinking monomer is allyl methacrylate. In some aspects of these embodiments, the crosslinking monomers include a combination of multi-ethylenically unsaturated monomers in which the ethylenically unsaturated groups have approximately equal reactivity and multi-ethylenically unsaturated monomers having two or more non-conjugated double bonds of differing reactivity.

In some embodiments of the present invention, the diffuser polymer particles are prepared using any known polymerization technique suitable for use with the starting materials selected. In some aspects of these embodiments, although other techniques for preparing particles having the particle size, size distribution and spherical configuration can be used, the preparation of the diffuser polymer particles involves preparing uniformly sized seed particles by emulsion polymerizing at least one monomer component of the diffuser polymer particles, swelling the seed particles with one or more monomer components of the diffuser polymer particles, and polymerizing the monomer within the swelled seed particles. The swelling and polymerizing steps can be repeated as necessary to provide diffuser polymer particles of the desired size. In some aspects of these the procedure for making the diffuser polymer particles involves emulsion polymerizing the seed particles using conditions that restrict the molecular weight of the polymer that forms, such as by including chain-transfer moderators, e.g., mercaptans, in the polymerization mixture, such that the resulting seed particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight.

In some embodiments of the present invention, the thermosensitive layer of the thermal recording material comprises 10 to 70 wt % of diffuser polymer particles, based on the total dry weight of the thermosensitive layer (i.e., total dry weight of heat deformable particles, binder and diffuser polymer particles). In some aspects of these embodiments, the diffuser polymer particles comprise 10 to 60 wt % of the thermosensitive layer. In some aspects of these embodiments, the diffuser polymer particles comprise 30 to 50 wt % of the thermosensitive layer.

In some embodiments of the present invention, the diffuser polymer particles have an average particle size of 0.85 to 15 microns. In some aspects of these embodiments, the diffuser polymer particles have an average particle size of 0.85 to 10 microns. In some aspects of these embodiments, the diffuser polymer particles have an average particle size of 1.0 to 10 microns. In some aspects of these embodiments, the diffuser polymer particles have an average particle size of 1.0 to 8 microns. In some aspects of these embodiments, the diffuser polymer particles have an average particle size of 1.0 to 5 microns. In some aspects of these embodiments, the diffuser polymer particles have an average particle size of 1.2 to 5 microns. In some aspects of these embodiments, the diffuser polymer particles have an average particle size of 1.5 to 3 microns.

In some embodiments of the present invention, the diffuser polymer particles exhibit a size distribution such that at least 90 wt % of the diffuser polymer particles fall within ±40% of the average particle size. In some aspects of these embodiments, the diffuser polymer particles exhibit a size distribution such that at least 90 wt % of the diffuser polymer particles fall within ±35% of the average particle size. In some aspects of these embodiments, the diffuser polymer particles exhibit a size distribution such that at least 90 wt % of the diffuser polymer particles fall within ±32% of the average particle size.

In some embodiments of the present invention, the diffuser polymer particles have a crosslinking density of >4 to 99 wt %. In some aspects of these embodiments, the diffuser polymer particles have a crosslinking density of 5 to 50 wt %. In some aspects of these embodiments, the diffuser polymer particles have a crosslinking density of 5 to 10 wt.%.

In some embodiments of the present invention, the diffuser polymer particles have a refractive index at a center thereof ($RI_{center}$) that is less than a refractive index at a surface thereof ($RI_{surface}$). In some aspects of these embodiments, the $RI_{center}$ is 0.003 to 0.4 units less than the $RI_{surface}$. In some aspects of these embodiments the $RI_{center}$ is 0.008 to 0.1 units less than the $RI_{surface}$. In some aspects of these embodiments the $RI_{center}$ is 0.01 to 0.05 units less than the $RI_{surface}$. In some aspects of these embodiments the $RI_{center}$ is 0.01 to 0.03 units less than the $RI_{surface}$.

In some embodiments of the present invention, the $RI_{center}$ of the diffuser polymer particles is 1.46 to 1.59. In some aspects of these embodiments, the $RI_{center}$ of the diffuser polymer particles is 1.47 to 1.49, or even 1.50 to 1.61.

In some embodiments of the present invention, the $RI_{center}$ of the diffuser polymer particles is within ±0.003 to ±0.6 units of the refractive index of the heat deformable particles. In some aspects of these embodiments, the $RI_{center}$ of the diffuser polymer particles is within ±0.003 to <±0.05 units of the refractive index of the heat deformable particles. In some aspects of these embodiments, the $RI_{center}$ of the diffuser polymer particles is within ±0.003 to ±0.04 units of the refractive index of the heat deformable particles. In some aspects of these embodiments, the $RI_{center}$ of the diffuser polymer particles is within ±0.02 to ±0.04 units of the refractive index of the heat deformable particles. One of ordinary skill in the art given the specific teachings of this application will be able to select materials for the preparation of the diffuser polymer particles to provide said particles with the desired refractive index properties for use in combination with particular heat deformable particles.

In some embodiments of the present invention, the thermosensitive layer of the thermal recording material in accordance with the present invention further comprises optional additives. In some aspects of these embodiments, the optional additives are selected from conventional additives, including, for example, optional pigment(s) such as for example, calcium carbonate and silica, lubricants, coalescing agents, plasticizers, humectants, ultraviolet-light stabilizers, ultraviolet-light absorbers, antioxidants, flame retardants, dyes, thermal stabilizers, impact modifiers, processing aids, pigments and fluorescent whitening agents.

A latex containing the polymer diffuser particles and heat deformable particles can incorporate other materials such as, emulsifiers, surfactants, lubricants antifreezes, buffers, neutralizers, thickeners, rheology modifiers, wetting agents, biocides, antifoaming agents, biocides, chelating agents, dispersants, and water-repellants. Typical bases that may be incorporated in the thermoplastic layer according to the present invention include ammonia; fixed bases such as NaOH, KOH, and LiOH; amines such as diethanolamine, triethanolamine and any other known base to control pH.

In some embodiments of the present invention, the heat deformable particles, diffuser polymer particles, binder and optional additives are blended or mixed, in a solvent, to produce a formulation which may then be applied to the substrate and dried for provide the desired opaque layer. The solvent may be aqueous or organic, and is preferably aqueous having up to 100 wt. % water. The blending or mixing of components may be accomplished by any suitable mixing technique, known to persons of ordinary skill now or in the future, such as for example, without limitation, using a conventional low shear mixing apparatus.

The thermosensitive layer formulation is applied to the support by conventional coating means known in the art and dried, typically with the minimum heat for the minimum time to enable facile handling of the thermal recording material, whether in separate sheets or in roll form, while avoiding premature deformation of the heat deformable particles.

EXAMPLES

| Components/Materials | Batch | Solids (wt. %) of Feeds to Mix |
|---|---|---|
| 1. POLYWAX 725 dispersion (available from Baker Hughes; melting point 104 C.; heat of fusion 235 J/g) | BD-14-H1 | 32.9 |
| 2. GRIN Polymer Particles 19.2 wt. % butyl acrylate (BA) 0.8 wt. % divinylbenzene (DVB) 80 wt. % styrene (STY) (also with 5 wt. % PVOH as stabilizer present in aqueous dispersion) | HR06132013 | 32.0 |
| 3. Rhoplex P-308 binder | 005861575 | 49.5 |

4. The brightness was measured using Brightness Tester (Model S4-M), also commercially available from Technidyne Corporation, before and after the application of heat (120° C. for 10 min) to the coated mylar film. The standard used in these measurements was rated at 84.4 for brightness.

TABLE 1

Composition of Thermosensitive Layer Formulations 1 to 6

| | Solids | Formulation 1 | | Formulation 2 | |
|---|---|---|---|---|---|
| | (%) | Solid frac. | Wet g | Solid frac. | Wet g |
| Polywax | 32.91 | 0.70 | 34.03 | 0.30 | 14.59 |
| Beads | 32.00 | 0.00 | 0.00 | 0.40 | 20.00 |
| Binder | 49.45 | 0.30 | 9.71 | 0.30 | 9.71 |
| Water | | | 6.26 | | 5.71 |

| | Solids | Formulation 3 | | Formulation 4 | |
|---|---|---|---|---|---|
| | (%) | Solid frac. | Wet g | Solid frac. | Wet g |
| Polywax | 32.91 | 0.80 | 38.89 | 0.40 | 19.45 |
| Beads | 32.00 | 0.00 | 0.00 | 0.40 | 20.00 |
| Binder | 49.45 | 0.20 | 6.47 | 0.20 | 6.47 |
| Water | | | 4.63 | | 4.08 |

| | Solids | Formulation 5 | | Formulation 6 | |
|---|---|---|---|---|---|
| | (%) | Solid frac. | Wet g | Solid frac. | Wet g |
| Polywax | 32.91 | 0.90 | 43.76 | 0.50 | 24.31 |
| Beads | 32.00 | 0.00 | 0.00 | 0.40 | 20.00 |
| Binder | 49.45 | 0.10 | 3.24 | 0.10 | 3.24 |
| Water | | | 3.01 | | 2.46 |

TABLE 2

Test Results and Conclusions

| Formulation (Solids Fraction) | | | Coat Wt | Opacity (Transmission) | | | Brightness (Reflectance) | | |
|---|---|---|---|---|---|---|---|---|---|
| Polywax | GRIN Bead | Binder | g/m2 | Initial | Final | Δ | Initial | Final | δ |
| 0.7 | 0.0 | 0.3 | 15.3 | 19.9 | 12.8 | 7.1 | 78.4 | 77.3 | 1.1 |
| 0.3 | 0.4 | 0.3 | 14.9 | 27.3 | 13.3 | 14.0 | 82.5 | 78.4 | 4.2 |
| 0.8 | 0.0 | 0.2 | 16.8 | 19.9 | 12.8 | 7.1 | 79.4 | 77.3 | 2.1 |
| 0.4 | 0.4 | 0.2 | 16.6 | 53.3 | 13.8 | 39.6 | 86.1 | 77.4 | 8.7 |
| 0.9 | 0.0 | 0.1 | 15.1 | 50.8 | 14.6 | 36.2 | 85.3 | 78.9 | 6.5 |
| 0.5 | 0.4 | 0.1 | 14.9 | 57.2 | 13.5 | 43.7 | 87.2 | 78.3 | 8.9 |

Procedure 1. 50 gram formulations at 32% solids were prepared as listed; ensuring that pH of the dispersion of GRIN Polymer Particles was adjusted to 9.5 before use.
2. They were coated on a clear mylar film at desired coat weight.
3. The opacity was measured using Opacity Tester (Model 425), commercially available from Technidyne Corporation of New Albany, Ind., USA, before and after the application of heat (120° C. for 10 minutes) to the coated mylar film.

The presence of diffuser polymer particles bead in the thermosensitive layer gives greater initial opacity and brightness than with heat deformable particles (here, POLYWAX®) alone.

Application of heat makes the thermosensitive layer transparent, and the layer containing the diffuser polymer particles gives greater difference in initial and final opacity and brightness, which enhances final contrast of the resulting image.

What is claimed is:

1. A thermal recording material having a thermosensitive layer comprising single phase diffuser polymer particles, each of which has a center, a surface, a refractive index at the center thereof ($RI_{center}$) different from a refractive index at the surface thereof ($RI_{surface}$), and a continuous refractive index gradient, the thermosensitive layer further comprising heat deformable particles and a binder.

2. The thermal recording material of claim 1, wherein the thermosensitive layer comprises from 10 to 70 wt. % of diffuser polymer particles, based on the total dry weight of the thermosensitive layer.

3. The thermal recording material of claim 1, wherein the diffuser polymer particles comprise at least one monomer selected from the group consisting of $C_1$-$C_8$ alkyl (meth) acrylates and styrene.

4. The thermal recording material of claim 1, wherein the diffuser polymer particles have a $RI_{center}$ of from 1.46 to 1.61.

5. The thermal recording material of claim 1, wherein the diffuser polymer particles have a particle size of 0.85 to 15 microns.

6. A method for providing an image comprising: subjecting selected portions of a recording material according to claim 1 to a physical agent selected from the group consisting of heat, pressure, and combinations thereof, sufficient to reduce the opacity of said selected portions.

7. The thermal recording material of claim 1, wherein the thermosensitive layer comprises (a) from 10 to 70 wt. % of diffuser polymer particles, based on the total dry weight of the thermosensitive layer and (b) at least one monomer selected from the group consisting of $C_1$-$C_8$ alkyl (meth)acrylates and styrene; and wherein the diffuser polymer particles have a $RI_{center}$ of from 1.46 to 1.61 and a particle size of 0.85 to 15 microns.

8. A method for providing an image comprising: subjecting selected portions of a recording material according to claim 7 to a physical agent selected from the group consisting of heat, pressure, and combinations thereof, sufficient to reduce the opacity of said selected portions.

* * * * *